(12) United States Patent
Armstrong

(10) Patent No.: US 6,739,445 B2
(45) Date of Patent: May 25, 2004

(54) MULTI-CONVEYOR SYSTEM

(75) Inventor: Richard E. Armstrong, Corona, CA (US)

(73) Assignee: Casa Herrera, Inc., Pomona, CA (US)

( * ) Notice: Subject to any disclaimer, the term of this patent is extended or adjusted under 35 U.S.C. 154(b) by 0 days.

(21) Appl. No.: 10/106,638

(22) Filed: Mar. 26, 2002

(65) Prior Publication Data

US 2003/0183494 A1 Oct. 2, 2003

(51) Int. Cl.[7] .............................................. B65G 47/26
(52) U.S. Cl. ...................................... 198/435; 198/436
(58) Field of Search ............................. 198/369.2, 435, 198/436, 861.5, 802, 578, 589, 592

(56) References Cited

U.S. PATENT DOCUMENTS

| | | | | |
|---|---|---|---|---|
| 4,846,336 A | * | 7/1989 | Hoyland et al. | 198/436 |
| 5,810,149 A | * | 9/1998 | Sandberg et al. | 198/369.2 |
| 6,152,284 A | * | 11/2000 | Sandberg et al. | 198/436 X |
| 6,279,721 B1 | * | 8/2001 | Lyngso et al. | 198/369.2 |

FOREIGN PATENT DOCUMENTS

| | | | | |
|---|---|---|---|---|
| DE | 4323566 | * | 1/1995 | 198/369.2 |

* cited by examiner

Primary Examiner—James R. Bidwell
(74) Attorney, Agent, or Firm—Myers Dawes Andras & Sherman LLP; Joseph C. Andras

(57) ABSTRACT

A conveyor system for transitioning articles between an external intermittent conveyor and an external continuous conveyor system includes an upper conveyor and lower conveyor. Each conveyor includes an infeed arm movable toward and away from the intermittent conveyor. Each infeed arm defines an infeed end that is movable along a common arc and rotatable about a common pivot point. With the infeed ends traveling along a common arc, each infeed end is easily moved to the same optimal receiving position for receiving articles from the intermittent conveyor. Each conveyor may switch between a continuous mode, wherein articles are continuously discharged onto the continuous conveyor, and an intermittent mode, wherein articles are intermittently received from the intermittent conveyor.

17 Claims, 4 Drawing Sheets

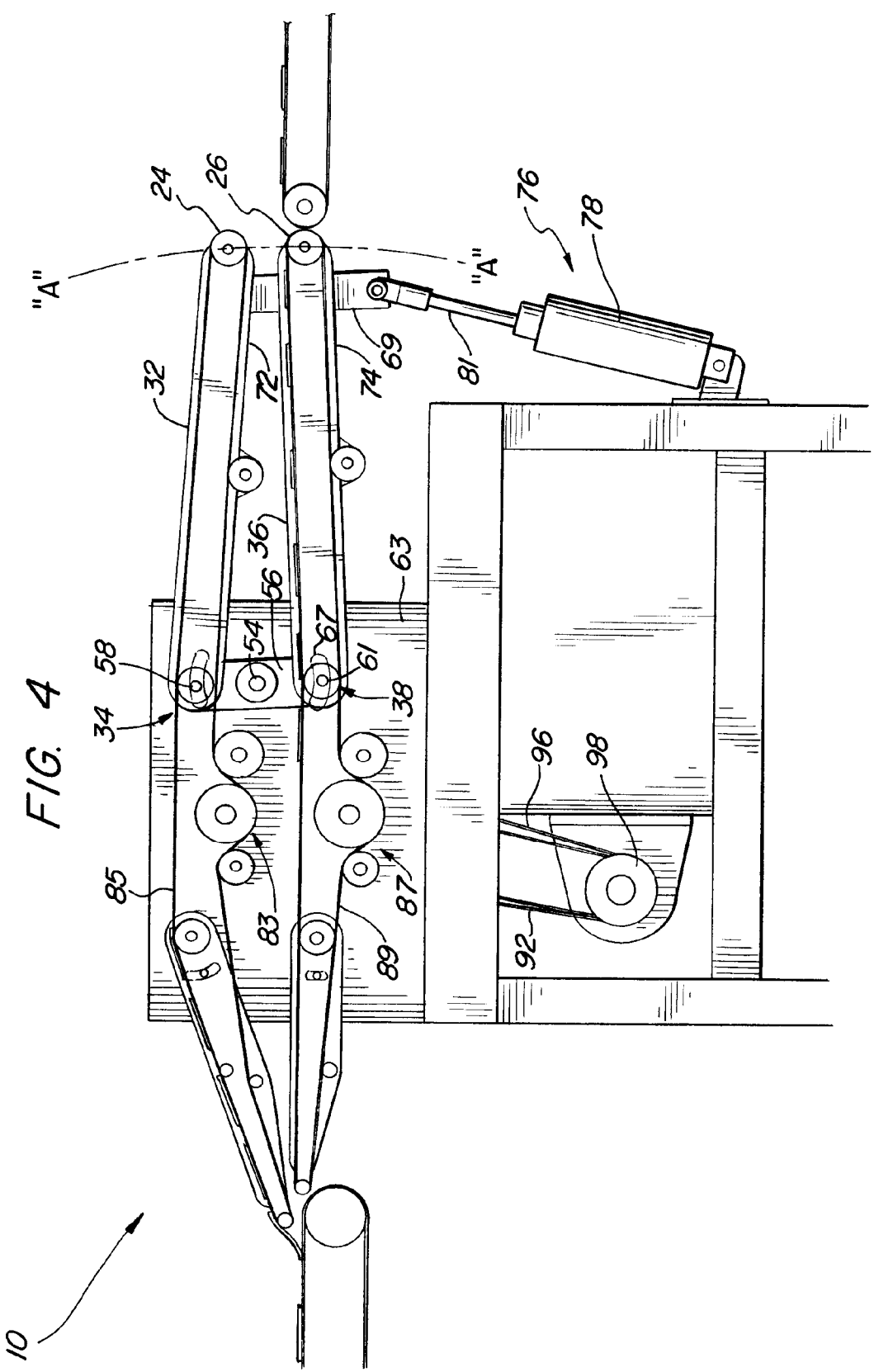

MULTI-CONVEYOR SYSTEM

BACKGROUND OF THE INVENTION

1. Field of the Invention

The present invention relates generally to conveyor systems and more specifically to apparatuses and methods for transferring product from a press to an oven.

2. Description of Prior Art and Related Information

To mass produce food products which require flattening and heating, food assembly lines are often provided with a press and an oven. For example, flour tortillas are made from dough balls which are carried through a press. Since a press commonly consists of plates which compress against the food products on a conveyor belt, the conveyor of the press travels in an intermittent mode. This stop-and-go motion allows for plates of the press to come together to flatten the products when the belt is stationary, and then for the flattened products to be transported to the oven while a new batch of dough balls are carried in.

Conveyors in ovens, however, travel in a continuous fashion. Furthermore, continuous conveyors in ovens travel at a constant speed which is generally slower than the maximum speeds reached by intermittent conveyors. An intermittent press conveyor cannot be directly linked to a continuous oven conveyor without overloading food product onto the continuous oven conveyor. Therefore, a discharge system is generally required for transitioning food products from the intermittent conveyor of the press to the continuous conveyor of the oven.

A common discharge system includes a conveyor having both an intermittent and continuous mode of motion. The discharge conveyor travels in the intermittent mode when receiving a batch of product from the press, and then in the continuous mode when discharging the batch onto the oven conveyor. Since the discharge conveyor cannot switch back to the intermittent mode until the carried batch is entirely transitioned onto the oven conveyor, the discharge conveyor is thus precluded from receiving any new batch until the old batch is unloaded. This results in gaps along the oven conveyor, leading to suboptimal efficiency.

The prior art includes a discharge system with two conveyors. Each conveyor includes an infeed arm adapted to receive product from the press, and an outfeed arm adapted to discharge product onto the oven conveyor. Each infeed arm in the prior art system is independently pivotal, with the infeed end of each infeed arm traveling in its own arc. With each infeed arm traveling in its own arc, a greater degree of complexity is involved in configuring the system such that the arms are movable to the optimal position adjacent to the press conveyor for receiving product.

The prior art discharge system usually requires one infeed arm to be substantially longer than the other in order for it to reach the press conveyor. Even with such differing lengths, however, it is difficult for both the infeed arms to travel to the optimal position for receiving product, which position is generally a fraction of an inch in front and a fraction of an inch below the outfeed end of the press conveyor. Such misalignment results in various problems. The products may become deformed as while being transferred to infeed arms of the discharge system.

Furthermore, another major disadvantage with the prior art system lies in the complexity caused by the independent pivoting motion of each infeed arm. With each independently pivoting infeed arm traveling in its own arc, the prior art system requires a great degree of calculation in attempting to design both infeed arms to travel to the optimal receiving position. With the dimensions of the infeed arms being large while the optimal receiving position is precise, any slight miscalculation can lead to a defective system which may require expensive and time consuming adjustments.

SUMMARY OF THE INVENTION

The present invention provides structures and methods which overcome the deficiencies in the prior art.

As used herein, words such as "front", "rear", "infeed" and "outfeed" are used to describe directions referring to the direction in which a product travels, namely, from an intermittent conveyor to a continuous conveyor. Thus, the "front" or "outfeed" direction is toward the continuous conveyor and away from the intermittent conveyor. In contradistinction, "infeed" or "rear" refer to a direction toward the intermittent conveyor and away from the continuous conveyor.

In one aspect, a discharge conveyor system is provided for use in transitioning product from a first conveyor to a second conveyor having different modes of movement. The discharge conveyor system comprises a first infeed arm having a first input end and a second infeed arm having a second input end. The first input end and the second input end are movable along a substantially common arc. The first infeed arm comprises a first output end, and the second infeed arm comprises a second output end. The system further comprises a fulcrum to which the first infeed arm and second infeed arm are coupled, the first output end and the second output end being rotatable about the fulcrum.

The system further comprises a first arcuate guide disposed above the fulcrum and a second arcuate guide disposed below the fulcrum. The first infeed arm comprises a first follower configured to travel along the first arcuate guide. The second output arm comprises a second follower configured to travel along the second arcuate guide. The system further comprises a sidewall. The first arcuate guide comprises a first arcuate slot defined on the sidewall, and the second arcuate guide comprises a second arcuate slot defined on the sidewall. A lifting mechanism is coupled to the first input end and the second input end. The system further comprises a first output arm adjacent to the first infeed arm and a second output arm adjacent to the second infeed arm.

In another aspect, a food processing system is provided. The food processing system comprises a press with an intermittent conveyor, an oven with a continuous conveyor, and a discharge system disposed between the press and the oven. The discharge system comprises a first infeed arm with a first input end and a second infeed arm with a second input end. The first infeed arm is movable between a first near position adjacent to the intermittent conveyor and a first far position away from the intermittent conveyor. The second infeed arm is movable between a second near position adjacent to the intermittent conveyor and a second far position away from the intermittent conveyor. The first input end and the second input end are movable along a substantially common arc.

The discharge system further comprises a first outfeed arm disposed between the first infeed arm and the continuous conveyor, and a second outfeed arm disposed between the second infeed arm and the continuous conveyor. The first infeed arm comprises a first output end that is movable between a first forward position when the first infeed arm is in the first far position, and a first rearward position when the first infeed arm is in the first near position. The second infeed arm comprises a first output end that is movable between a second forward position when the second infeed arm is in the second far position and a second rearward position when the second infeed arm is in the second near position.

A method is provided for transporting food product from a press to an oven. The method comprises moving a first infeed end of a first infeed conveyor along an arc toward the press, receiving a first batch of food product from a press conveyor with a first infeed conveyor, moving the first infeed end along the arc away from the press, discharging the first batch of food product onto an oven conveyor, moving a second infeed end of a second infeed conveyor along the arc toward the press, receiving a second batch of food product from the press conveyor with a second infeed conveyor, moving the second infeed end along the arc away from the press, and discharging the second batch of food product onto the oven conveyor.

The step of receiving a first batch of food product from a press conveyor with a first infeed conveyor comprises the step of intermittently receiving the first batch of food product with the first infeed conveyor. The step of receiving a second batch of food product from a press conveyor with a second infeed conveyor comprises the step of intermittently receiving the second batch of food product with the second infeed conveyor. The step of discharging the first batch of food product onto an oven conveyor comprises the step of continuously discharging the first batch of food product onto the oven conveyor. The step of discharging the second batch of food product onto an oven conveyor comprises the step of continuously discharging the second batch of food product onto the oven conveyor. The step of moving a first infeed end of a first infeed conveyor along an arc toward the press may occur simultaneously with the step of moving the second infeed end along the arc away from the press. The step of moving a second infeed end of a second infeed conveyor,along the arc toward the press and the step of moving the first infeed end along the arc away from the press may also occur simultaneously. The step of discharging the first batch of food product onto an oven conveyor and the step of receiving a second batch of food product from the press conveyor with a second infeed conveyor may occur simultaneously.

A method is also provided for transporting product from an intermittent conveyor to a continuous conveyor. The method comprises providing a first conveyor with a first infeed arm and a first infeed end, providing a second conveyor with a second infeed arm and a second infeed end, rotating the first infeed end about a fulcrum to move the first infeed end toward and away from the intermittent conveyor, rotating the second infeed end about the fulcrum to move the first infeed end toward and away from the intermittent conveyor, intermittently receiving a first batch of product from the intermittent conveyor with the first conveyor, continuously discharging the first batch of product onto the continuous conveyor, intermittently receiving a second batch of product from the intermittent conveyor with the second conveyor, and continuously discharging the second batch of product onto the continuous conveyor.

The method further comprises the step of coupling the first infeed end to the second infeed end such that moving the first infeed end toward the intermittent conveyor moves the second infeed end away from the intermittent conveyor and moving the second infeed conveyor toward the intermittent conveyor moves the first infeed conveyor away from the conveyor.

In summary, a conveyor system for transitioning articles between an external intermittent conveyor and an external continuous conveyor system includes an upper conveyor and lower conveyor. Each conveyor includes an infeed arm movable toward and away from the intermittent conveyor. Each infeed arm defines an infeed end that is movable along a common arc and rotatable about a common pivot point. With the infeed ends traveling along a common arc, each infeed end is easily moved to the same optimal receiving position for receiving articles from the intermittent conveyor. Each conveyor may switch between a continuous mode, wherein articles are continuously discharged onto the continuous conveyor, and an intermittent mode, wherein articles are intermittently received from the intermittent conveyor.

The invention, now having been briefly summarized, may be better appreciated by the following detailed description.

BRIEF DESCRIPTION OF THE DRAWINGS

FIG. 4 is an operative, side elevation view of the preferred embodiment of the conveyor system.

DETAILED DESCRIPTION OF THE PREFERRED EMBODIMENTS

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

Figure 1:
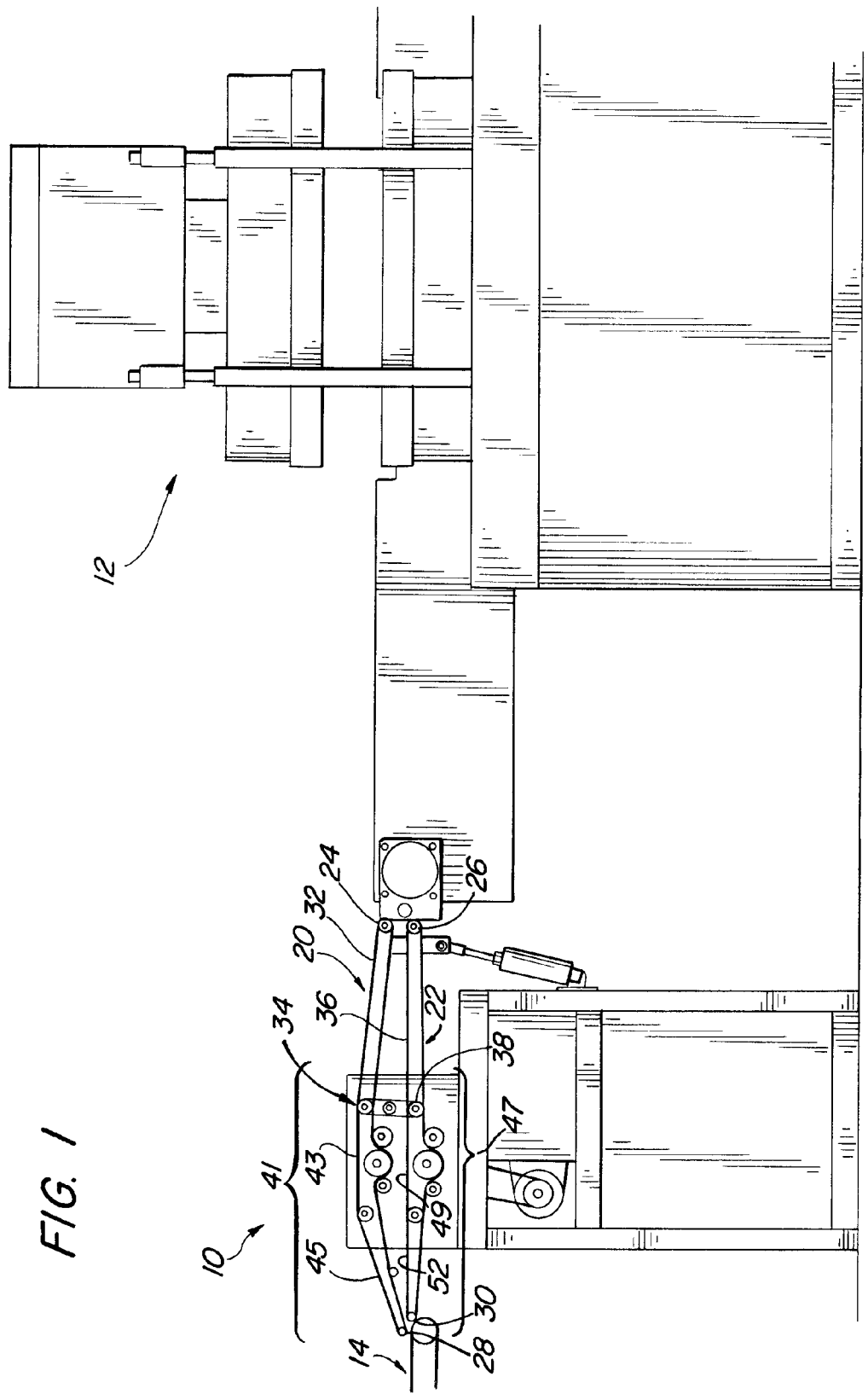
FIG. 1 is a side elevation view of a preferred embodiment of a conveyor system according to the invention.

A preferred embodiment of a transition conveyor system, or discharge system, is illustrated in FIG. 1 and designated generally by the reference numeral 10. In the preferred embodiment, the system 10 is adapted for transitioning food product from an intermittent press conveyor 12 to a continuous oven conveyor 14. It is to be expressly understood, however, that system 10 may be employed to transport any type of article from any intermittent conveyor to any continuous conveyor.

In FIG. 1, the system 10 comprises multiple conveyors, namely, a first, upper conveyor 20 and a second, lower conveyor 22. Each conveyor 20, 22 has an infeed end 24, 26, respectively, adjacent to the intermittent press conveyor 12 and an outfeed end 28, 30, respectively, adjacent to the continuous oven conveyor 14. The first conveyor 20 includes a first, upper infeed arm 32 extending from the first, upper infeed end 24 to a first, front infeed arm end 34. Similarly, the second conveyor 22 includes a second, lower infeed arm 36 extending from the second, lower infeed end 26 to a second, front infeed arm end 38.

The first conveyor 20 further comprises a first, upper outfeed section 41 in front of the first infeed arm 32. In the preferred embodiment, the first outfeed section 41 comprises a first horizontally level portion 43 adjacent to the first, front infeed arm end 34, and a first, upper outfeed arm 45 slanted downwardly toward the continuous conveyor 14. Similarly, the second conveyor 22 comprises a second, lower outfeed section 47. The second outfeed section 47 preferably comprises a second horizontally level portion 49 adjacent to the second, front infeed arm end 38, and a second, lower outfeed arm 52 that is preferably level with the continuous conveyor 14.

Figure 2:
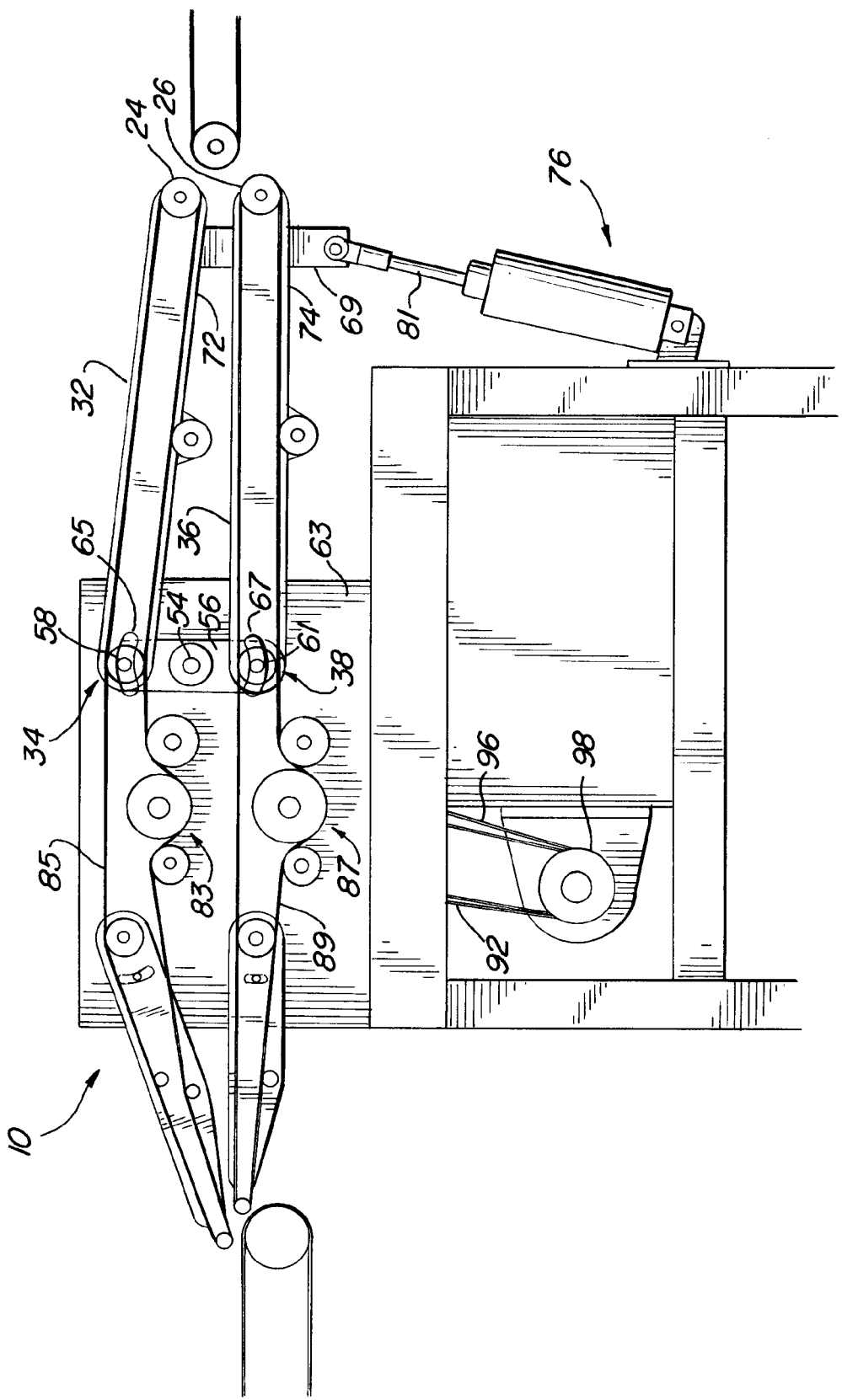
FIG. 2 is a side elevation view of the preferred embodiment of the conveyor system.

In FIG. 2, the infeed arms 32, 36 are configured such that the upper infeed end 24 and the lower infeed end 26 are movable along a substantially common arc "A". Accordingly, the infeed ends 24, 26 generally rotate about a common pivot point 54. It is to be expressly understood that a variety of mechanisms and structures may be employed to cause the infeed ends 24, 26 to travel along the same arc and, thus, rotate about a common pivot point. As an example, the upper, front infeed arm end 34 is preferably coupled to the lower, front infeed arm end 38 by a pair of pivot arms 56, each of which pivot about the common pivot point 54.

Each pivot arm 56 is coupled to an upper front shaft 58 of the upper infeed arm 32 and a lower front bar 61 of the lower infeed arm 36. The upper front bar 58 and lower front shaft 61 define minor pivot points about which the upper infeed arm 32 and the lower infeed arm 36 respectively pivot. The system 10 further comprises a pair of sidewalls 63. Each sidewall 63 includes an upper, arcuate guide 65 curved toward the common pivot point 54 and a lower, arcuate guide 67 also curved toward the common pivot point 54. In the preferred embodiment, the arcuate guides 65, 57 comprise slots defined in the sidewalls 63.

A link 69 couples an upper rear portion 72 of the upper infeed arm 32 to a lower rear portion 74 of the lower infeed arm 36. A lifting and lowering mechanism 76 is coupled to the link 69 to raise and lower the upper infeed end 24 and the lower infeed end 26. In the preferred embodiment, the mechanism 76 comprises an air cylinder 78 and associated rod 81.

In FIG. 2, an upper pulley 83 is provided for an upper conveyor belt 85 of the upper conveyor 20 while a lower pulley 87 is provided for a lower conveyor belt 89 of the lower conveyor 22. A first pulley belt 92 is coupled to the upper pulley 83 and a first motor 94 while a second pulley belt 96 is coupled to the lower pulley 87 and a second motor 98. Knobs 101 are provided for adjusting the tension of the conveyor belts 85, 89.

Figure 3:
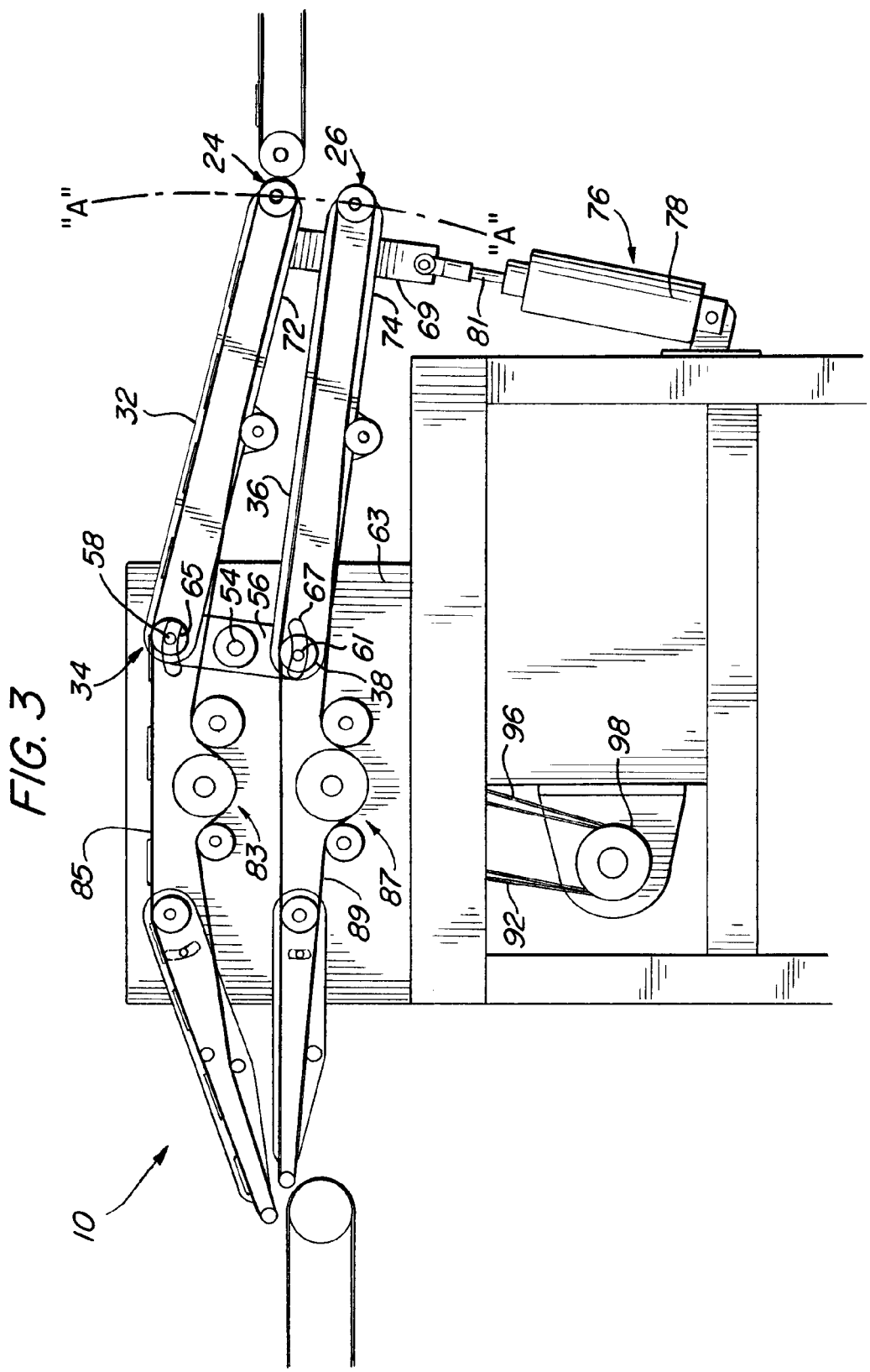
FIG. 3 is an operative, side elevation view of the preferred embodiment of the conveyor system.

FIG. 3 is a side elevation view of the system 10 in operation. In FIG. 3, the upper infeed arm 32 is moved toward the intermittent press conveyor 12 to place the upper infeed end 24 in the optimal receiving position P. As an example and not by way of limitation, the optimal receiving position P is located approximately 0.25 inch below and 0.25 in front of a transition roller 103 disposed at a front end of the intermittent press conveyor 12. The transition roller 103 helps transfer the flattened products from the intermittent press conveyor onto the infeed arms 32, 36 of the system 10.

In the preferred embodiment, the upper infeed end 24 travels along the common arc "A" as the upper infeed arm 32 is lowered by the mechanism 76. In FIG. 5, the upper front infeed arm end 34 travels in a clockwise direction around the common pivot point 54 as the upper front shaft 58 is guided by the upper arcuate slots 65. Simultaneously, the lower infeed end 26 travels along the common arc "A" away from the intermittent press conveyor 12 as the lower infeed arm 36 is also lowered by the mechanism 76. Accordingly, the lower, front infeed arm end 38 also travels in a clockwise direction around the common pivot point 54 as the lower front shaft is guided by the lower arcuate slots 67.

A first batch of product 105 is intermittently loaded onto the upper infeed arm 32 with the upper conveyor 20 moving in an intermittent mode matching the intermittent mode of the press conveyor 12. Each batch of product is defined by the number of food articles the press 16 flattens in one cycle or stamp. To prevent overloading of the system 10, the speed of the conveyors 20, 22 in the intermittent mode is preferably equal to or greater than the speed of the intermittent press conveyor 12. The conveyors 20, 22 are configured, such as by a PLC machine, to travel in an intermittent mode for a predetermined duration at a predetermined speed necessary to fully load each batch thereon.

After the first batch 105 is fully loaded onto the upper conveyor 20, the upper conveyor 20 switches to a continuous mode. The batch 105 is carried from the upper infeed arm 32 to the upper outfeed section 41 and then continuously transferred to the continuous oven conveyor 14. To prevent overloading of the oven 18, the speed of the conveyors 20, 22 in the continuous mode is equal to or less than the speed of the continuous oven conveyor 14.

After the first batch 105 is fully loaded onto the upper conveyor 20, the upper infeed arm 32 is moved away from the intermittent press conveyor 20 while the lower infeed arm 32 is brought toward the intermittent press conveyor 20. Again, the infeed ends 24, 26 travel along the substantially common arc "A", this time in a counterclockwise direction around the common pivot point 54. The lower infeed end 26 is then brought to the optimal receiving position "P". A second batch of product 107 is intermittently loaded onto the lower conveyor 22 in a similar fashion as described above with respect to the upper conveyor 20.

With multiple conveyors 20, 22, it will be appreciated that one batch 105 of product may be continuously discharged onto the continuous oven conveyor 14 while another batch 107 of product is simultaneously received from the intermittent press conveyor 12 in an intermittent fashion.

The system 10 is configured such that movement of the infeed arms 32, 36 results in the infeed ends 24, 26, respectively, traveling in the substantially common arc "A" and rotating generally about the common pivot point 54. By having both infeed ends 24, 26 travel along the same arc, it will be appreciated that the ends 24, 26 are more easily movable to the optimal receiving position "P", a feat which has been extremely difficult, if not impossible, with the separately arching infeed arms of prior art systems.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what incorporates the essential idea of the invention.

What is claimed is:

1. A discharge conveyor system for use in transitioning product from a first conveyor to a second conveyor having different modes of movement, comprising:
   a first infeed arm having a first input end; and
   a second infeed arm having a second input end,
   wherein the first input end and the second input end are movable along a substantially common arc.

2. The system of claim 1, wherein the first infeed arm comprises a first output end and the second infeed arm comprises a second output end, the system further comprising a fulcrum to which the first infeed arm and second infeed arm are coupled, the first output end and the second output end being rotatable about the fulcrum.

3. The system of claim 2, further comprising:
   a first arcuate guide disposed above the fulcrum; and
   a second arcuate guide disposed below the fulcrum.

4. The system of claim 3, wherein:
   the first infeed arm comprises a first follower configured to travel along the first arcuate guide; and
   the second output arm comprises a second follower configured to travel along the second arcuate guide.

5. The system of claim 4, further comprising a sidewall, and wherein:
   the first arcuate guide comprises a first arcuate slot defined on the sidewall; and
   the second arcuate guide comprises a second arcuate slot defined on the sidewall.

6. The system of claim 1, further comprising a lifting mechanism coupled to the first input end and the second input end.

7. The system of claim 1, further comprising:
   a first output arm adjacent to the first infeed arm; and
   a second output arm adjacent to the second infeed arm.

8. A food processing system comprising:
   a press comprising an intermittent conveyor;
   an oven comprising a continuous conveyor; and
   a discharge system disposed between the press and the oven, the discharge system comprising:
     a first infeed arm with a first input end, the first infeed arm being movable between a first near position adjacent to the intermittent conveyor and a first far position away from the intermittent conveyor; and
     a second infeed arm with a second input end, the second infeed arm being movable between a second near position adjacent to the intermittent conveyor and a second far position away from the intermittent conveyor,
     wherein the first input end and the second input end are movable along a substantially common arc.

9. The food processing system of claim 8, wherein the discharge system further comprises:
   a first outfeed arm disposed between the first infeed arm and the continuous conveyor; and
   a second outfeed arm disposed between the second infeed arm and the continuous conveyor.

10. The food processing system of claim 8, wherein:
    the first infeed arm comprises a first output end that is movable between a first forward position when the first infeed arm is in the first far position and a first rearward position when the first infeed arm is in the first near position; and
    the second infeed arm comprises a first output end that is movable between a second forward position when the second infeed arm is in the second far position and a second rearward position when the second infeed arm is in the second near position.

11. A method of transporting food product from a press to an oven, comprising:
    moving a first infeed end of a first infeed conveyor along an arc toward the press;
    receiving a first batch of food product from a press conveyor with a first infeed conveyor;
    moving the first infeed end along the arc away from the press;
    discharging the first batch of food product onto an oven conveyor;
    moving a second infeed end of a second infeed conveyor along the arc toward the press;
    receiving a second batch of food product from the press conveyor with a second infeed conveyor;
    moving the second infeed end along the arc away from the press; and
    discharging the second batch of food product onto the oven conveyor.

12. The method of claim 11, wherein:
    receiving a first batch of food product from a press conveyor with a first infeed conveyor comprises intermittently receiving the first batch of food product with the first infeed conveyor; and
    receiving a second batch of food product from a press conveyor with a second infeed conveyor comprises intermittently receiving the second batch of food product with the second infeed conveyor.

13. The method of claim 12, wherein:
    discharging the first batch of food product onto an oven conveyor comprises continuously discharging the first batch of food product onto the oven conveyor; and
    discharging the second batch of food product onto an oven conveyor comprises continuously discharging the second batch of food product onto the oven conveyor.

14. The method of claim 11, wherein:
    the step of moving a first infeed end of a first infeed conveyor along an arc toward the press and the step of moving the second infeed end along the arc away from the press occur simultaneously; and
    the step of moving a second infeed end of a second infeed conveyor along the arc toward the press and the step of moving the first infeed end along the arc away from the press occur simultaneously.

15. The method of claim 11, wherein the step of discharging the first batch of food product onto an oven conveyor and the step of receiving a second batch of food product from the press conveyor with a second infeed conveyor occur simultaneously.

16. A method of transporting product from an intermittent conveyor to a continuous conveyor, comprising:

provided a first conveyor with a first infeed arm and a first infeed end;

providing a second conveyor with a second infeed arm and a second infeed end;

rotating the first infeed end about a fulcrum to move the first infeed end toward and away from the intermittent conveyor;

rotating the second infeed end about the fulcrum to move the first infeed end toward and away from the intermittent conveyor;

intermittently receiving a first batch of product from the intermittent conveyor with the first conveyor;

continuously discharging the first batch of product onto the continuous conveyor;

intermittently receiving a second batch of product from the intermittent conveyor with the second conveyor; and continuously discharging the second batch of product onto the continuous conveyor.

17. The method of claim 16, further comprising coupling the first infeed end to the second infeed end such that moving the first infeed end toward the intermittent conveyor moves the second infeed end away from the intermittent conveyor and moving the second infeed conveyor toward the intermittent conveyor moves the first infeed conveyor away from the conveyor.

* * * * *